US010757514B2

(12) United States Patent
Rosenkranz et al.

(10) Patent No.: US 10,757,514 B2
(45) Date of Patent: Aug. 25, 2020

(54) METHOD OF SUPPRESSING AN ACOUSTIC REVERBERATION IN AN AUDIO SIGNAL AND HEARING DEVICE

(71) Applicant: SIVANTOS PTE. LTD., Singapore (SG)

(72) Inventors: Tobias Daniel Rosenkranz, Erlangen (DE); Oliver Dressler, Fuerth (DE)

(73) Assignee: Sivantos Pte. Ltd., Singapore (SG)

(*) Notice: Subject to any disclaimer, the term of this patent is extended or adjusted under 35 U.S.C. 154(b) by 0 days.

(21) Appl. No.: 16/448,304

(22) Filed: Jun. 21, 2019

(65) Prior Publication Data
US 2019/0394579 A1 Dec. 26, 2019

(30) Foreign Application Priority Data
Jun. 21, 2018 (DE) .......................... 10 2018 210 143

(51) Int. Cl.
H04R 25/00 (2006.01)

(52) U.S. Cl.
CPC ....... *H04R 25/505* (2013.01); *H04R 2225/43* (2013.01)

(58) Field of Classification Search
CPC .. H04R 25/00; H04R 25/505; H04R 2225/43; G10L 21/028; G10L 2021/020082; H04M 3/052
USPC ................ 381/317, 63, 66, 94.3; 379/416.14
See application file for complete search history.

(56) References Cited

U.S. PATENT DOCUMENTS

| 8,284,947 B2 | 10/2012 | Giesbrecht et al. |
| 8,442,250 B2 | 5/2013 | Klinkby |
| 9,530,429 B2 * | 12/2016 | Sunohara ............ G10L 21/0208 |
| 2006/0072766 A1 | 4/2006 | Klein et al. |
| 2011/0268283 A1 * | 11/2011 | Nakadai ................... H04R 3/04 381/56 |
| 2012/0328112 A1 | 12/2012 | Jeub et al. |
| 2018/0167747 A1 | 6/2018 | Kuriger et al. |

FOREIGN PATENT DOCUMENTS

| DE | 602004006912 T2 | 2/2008 |
| EP | 1667416 A2 | 6/2006 |
| EP | 3337190 A1 | 6/2018 |
| WO | 2007113283 A1 | 10/2007 |
| WO | 2011110239 A1 | 9/2011 |

* cited by examiner

Primary Examiner — Melur Ramakrishnaiah
(74) Attorney, Agent, or Firm — Laurence A. Greenberg; Werner H. Stemer; Ralph E. Locher

(57) ABSTRACT

A method of suppressing an acoustic reverberation in an audio signal includes providing an audio signal, carrying out a first level measurement of the audio signal and carrying out a second level measurement of the audio signal at least temporarily during the first level measurement. The first level measurement is carried out with a decay time and/or adjustment time that differs from a decay time or adjustment time of the second level measurement. An acoustic reverberation of the sound event in the audio signal is suppressed by attenuating the audio signal in response to a sound event in the audio signal. The attenuation is controlled as a function of a difference between the first level measurement and the second level measurement. A hearing device is also provided.

12 Claims, 2 Drawing Sheets

METHOD OF SUPPRESSING AN ACOUSTIC REVERBERATION IN AN AUDIO SIGNAL AND HEARING DEVICE

CROSS-REFERENCE TO RELATED APPLICATION

This application claims the priority, under 35 U.S.C. § 119, of German Patent Application DE 10 2018 210 143.4, filed Jun. 21, 2018; the prior application is herewith incorporated by reference in its entirety.

BACKGROUND OF THE INVENTION

Field of the Invention

The invention relates to a method of suppressing an acoustic reverberation in an audio signal. The invention also relates to a hearing device.

Acoustic reverberation usually occurs in closed or at least partially closed rooms as a result of a generating sound event reflecting multiple times on the walls of a room as well as on other objects that are present in the room. The decay time of the reverberation varies depending on the geometry of the room and its walls as well as the type, number and geometry of the objects present in the room, and is also influenced by the nature of the surfaces present in the room. In contrast to an echo, which may be perceived in isolation as a kind of "repetition" of the generating sound event, the reverberation causes the sound event to "linger," substantially continuously.

Although a minimum degree of reverberation is actually desirable for a pleasant listening sensation, in particular for music, in order to counteract an excessively "dry" staccato sound, acoustic reverberation is often disadvantageous for the intelligibility of speech contributions, because characteristic sound events for distinguishing the individual consonants in particular are only of very short duration, and a corresponding superimposition over the reverberation may considerably obscure the spectral information. Depending on the decay time, the problem may arise even for distinguishing formants in order to recognize vowels.

In hearing devices, which are often used to compensate for a hearing loss of the wearer in question, it is particularly important for the wearer to be able to reproduce the wearer's conversation partner's speech in a way that is as comprehensible as possible, because a hearing loss may be perceived as particularly pronounced and therefore particularly unpleasant when the wearer is acoustically unable to understand a speech contribution and accordingly suffers a loss of information that the wearer s able to recognize. Accordingly, hearing devices often employ techniques to improve the intelligibility of speech.

Especially when using a hearing device, however, acoustic reverberation may impair the intelligibility of speech to a great extent: In hearing devices, a dynamic compression of an input signal generated by a microphone of the hearing device is often used as part of the wearer-specific signal processing to compensate for the wearer's hearing loss. The dynamic compression in that case is intended to contribute in particular to amplifying quiet sound events that the wearer is barely or no longer able to perceive due to hearing loss, up to a sufficient perceptibility, without also applying the same amplification to sound events that are already loud enough and which the wearer is able to perceive without greater problems, in such a way that further amplification could lead to an unpleasant volume.

That dynamic compression, however, also "compresses" the acoustic reverberation, so that the reverberation undergoes a correspondingly greater amplification than the sound event that generates it. As a result, the wearer perceives the decay time in the present environment to be longer, and the intelligibility of speech contributions is also impaired as a result of the above-described correlations.

SUMMARY OF THE INVENTION

It is accordingly an object of the invention to provide a method of suppressing an acoustic reverberation in an audio signal and a hearing device, which overcome the hereinafore-mentioned disadvantages of the heretofore-known methods and devices of this general type and which are intended to be feasible in real time with as little computational complexity as possible, while also delivering as realistic a sound image as possible.

With the foregoing and other objects in view there is provided, in accordance with the invention, a method of suppressing an acoustic reverberation in an audio signal, wherein an audio signal is provided, a first level measurement of the audio signal is carried out, a second level measurement of the audio signal is carried out at least temporarily during the first level measurement, the first level measurement is carried out with a decay time that differs from a decay time of the second level measurement and/or the first level measurement is carried out with an adjustment time that differs from an adjustment time of the second level measurement, an acoustic reverberation of the sound event in the audio signal is suppressed by attenuating the audio signal in response to a sound event in the audio signal, and the attenuation is controlled as a function of a difference between the first level measurement and the second level measurement. Configurations that are advantageous and in part inventive in their own right are the subject matter of the dependent claims and the following description.

The suppression of an acoustic reverberation in an audio signal in particular encompasses suppressing those signal contributions in the audio signal that, in the real acoustic situation that the audio signal depicts, arise from an acoustic reverberation. The audio signal is provided in particular by using one or more electroacoustic transducers that convert this real acoustic situation into one or more signals, in particular electrical signals. In this case, in order to provide the audio signal, preprocessing may be carried out based on the in particular electrical signal(s) that have been generated in this way; this preprocessing may for example include digitization, amplification, dynamic compression or noise suppression. An acoustic reverberation includes in particular reflections of sound of a generating sound event on walls and/or objects, for example an at least partially closed room, in which a continuous or almost continuous decay of the sound event is produced at a fixed location as a result of multiple reflections of the propagating sound that the sound event generated.

A "level measurement" herein includes in particular a mathematical function being established by the level measurement, or the level measurement being represented as such a function, by which an amplitude of the audio signal and/or an envelope of the amplitude and/or an absolute square of the amplitude is mapped to a corresponding level value in a preferably strictly monotonic manner, and particularly preferably without an inflection point. In this regard, particular attention should be paid to those functions in which the relationship between their input variable and the displayed level value is not only logarithmic; the term "level measurement" should also encompass more general functions with a suitable monotonic behavior.

Carrying out the second level measurement of the audio signal at least temporarily during the first level measurement includes in particular carrying out one of the two level measurements respectively only at discrete points in time which may extend beyond a discretization in the context of digitization in providing the audio signal, with the missing level values being able to be interpolated between the thus-generated discrete sampling points in such a way that an in particular continuous comparison with the other level measurement may be made over a period of time in question. However, it is preferable to carry out both of the level measurements continuously (in the context of discretization predetermined by digitization).

A decay time of a level measurement refers in particular to the time that elapses, starting from a signal contribution in the audio signal and a corresponding level deflection in the level measurement, until the level measurement has dropped to zero or to a specified fraction of the level deflection in the absence of further signal contributions in the audio signal, for example the time constant T60 for a decrease of 60 dB. An adjustment time of a level measurement refers in particular to the time that elapses after a spontaneously-occurring stationary signal contribution in the audio signal until the level measurement has reached a predetermined fraction of the asymptotic limit value for the signal level that corresponds to the stationary signal contribution. A shorter adjustment time in this case means in particular a faster reaction of the level measurement to a spontaneously-occurring signal contribution in the audio signal.

In particular, an adjustment time and a decay time are assigned to each of the two level measurements, and the first level measurement and second level measurement differ from one another in at least one of the two parameters, adjustment time and decay time, that are respectively assigned to them for purposes of the present method, with a difference between the level measurements also being possible both in the adjustment times and in the decay times. In particular, the adjustment time of the first level measurement may be referred to as the "first adjustment time" and the decay time of the first level measurement may be referred to as the "first decay time," with the corresponding parameters associated with the second level measurement being referred to respectively as the "second adjustment time" or "second decay time."

Thus, there are three possibilities: the two adjustment times are identical while the first decay time differs from the second decay time, or the two decay times are identical while the first adjustment time differs from the second adjustment time, or that the first adjustment time differs from the second adjustment time and the first decay time differs from the second decay time.

A "sound event" in particular includes any sound-generating event in the real acoustic situation that the audio signal depicts and/or that is converted by using corresponding transducers in order to provide the audio signal, wherein a clear temporal end may be associated with the sound-generating event. In this context, suppressing the acoustic reverberation of the sound event in the audio signal refers in particular to suppressing those signal contributions that correspond to the acoustic reverberation of the sound event in the real acoustic situation.

The audio signal may be attenuated to suppress the acoustic reverberation in particular by using a corresponding gain or attenuation factor, with this factor being controlled as a function of the difference between the first level measurement and the second level measurement.

The proposed method makes it possible to distinguish a contribution of a sound event in the audio signal from a contribution in the audio signal that corresponds to an acoustic reverberation of the sound event, by using the different level progressions in the first or second level measurement due to the different decay time or different adjustment time, and to use this for a corresponding attenuation.

The first level measurement differs from the second level measurement at least in the decay time or in the adjustment time, or in both mentioned time constants. When the decay times of the two level measurements differ, the contribution of an acoustic reverberation decreases faster in the level measurement with the shorter decay time than in the level measurement with the longer decay time. If there is no longer an independent sound event in the audio signal, and instead only contributions of the acoustic reverberation are recorded, the difference between the first level measurement and the second level measurement will consequently increase, which may be used to control the attenuation of the audio signal in such a way that the audio signal is undergoes increasing attenuation as the difference increases. If the adjustment times differ, a suddenly-occurring sound event will cause an abrupt increase in the difference between the two measurements, because the level measurement with the slower adjustment time will only react to the later-occurring sound event. In this way, for different adjustment times, a sudden increase in the difference may be used to control the attenuation of the audio signal, so that the attenuation is largely suspended or not applied.

In particular, the proposed method may be applied on a frequency-band basis, i.e. the audio signal for the level measurements mentioned may be broken down into individual frequency bands, so that the two level measurements are carried out on a frequency-band basis in accordance with this breakdown, and the audio signal in the individual frequency bands may respectively be attenuated differently. This takes into account that the decay of acoustic reverberation in a given environment may exhibit frequency-dependence, in some cases to a considerable extent, and it may therefore be advantageous for certain frequency bands to apply no attenuation to the audio signal, or only a small attenuation, in order to keep changes or distortions of the audio signal as small as possible.

Preferably, the first level measurement is performed with a first decay time, the second level measurement is performed with a second decay time which is greater than the first decay time, and the attenuation of the audio signal for suppressing the acoustic reverberation in the audio signal is controlled by using a monotonically increasing function of the difference between the first level measurement and the second level measurement. If only the acoustic reverberation of a sound event is still present in the audio signal, and there are no longer any contributions from the sound event itself, the signal plot in the audio signal is substantially determined by the decay behavior, which is characteristic for the real acoustic situation that the audio signal represents. Due to the two different decay times for the first level measurement and second level measurement, the difference between the two level measurements increases over time for the contributions in the audio signal that are due to acoustic reverberation.

This difference may be used as an indicator for a confidence that the signal contributions concerned are really given by acoustic reverberation, and also as an indicator for a time offset relative to the sound event that generates the acoustic reverberation, on the other hand. To that extent, in the case described, the acoustic reverberation in the audio signal may be suppressed in such a way that as the difference between the two level measurements increases, the audio signal is more suppressed—in other words, the attenuation is described by a monotonically increasing function of the difference—because in the present case it is assumed that an increasing difference does not result in any independent new signal contributions due to sound events other than those that generate the acoustic reverberation, and therefore only the decaying acoustic reverberation makes a significant contribution to the audio signal. In particular, if the audio signal is to be further processed by dynamic compression, with increasing decay it may be advantageous to suppress the acoustic reverberation in the manner mentioned above, so that the decay due to dynamic compression is not artificially increased and thus extended.

Expediently, the first level measurement is carried out with a first adjustment time, and the second level measurement is carried out with a second adjustment time that is identical to the first adjustment time. The second decay time in this case is greater than the first decay time. This has the advantage that sound events in both level measurements respectively generate a level deflection with the same adjustment behavior, and as a result, independent sound events may be detected from the two level measurements, and this may be used to control the suppression of the acoustic reverberation. For example, in establishing the difference of the two level measurements as aforementioned, an independent sound event may be inferred by a disappearing difference of the two level measurements accompanied by simultaneous high level deflections in both level measurements. In this case there may be an attenuation of the audio signal applied to suppressing a previously-occurring acoustic reverberation.

In an advantageous configuration, the first level measurement is performed with a first adjustment time and first decay time and the second level measurement is performed with a second adjustment time different from the first adjustment time and a second decay time identical to the first decay time. A sound event is inferred based on an increase in the difference between the first level measurement and the second level measurement, wherein after the start of the sound event the attenuation of the audio signal for suppressing the acoustic reverberation in the audio signal is controlled by using a monotonically decreasing function of the difference between the first level measurement and second level measurement. A sound event may be recognized in particular by the difference increasing above a specified threshold value.

If, in the manner described, a sound event is recognized that could potentially cause signal contributions from an acoustic reverberation in the audio signal, then due to the identical decay time of the two level measurements, an acoustic reverberation—in the absence of further signal contributions—has substantially the same decay behavior in both level measurements, and as a result, the difference of the level measurements ideally will approach zero when the decay behavior begins in both level measurements. Both level measurements respectively change their decay behavior when the measured level reaches the acoustic reverberation of the sound event actually present in the audio signal, and then decay with the acoustic reverberation according to the shared decay time of both level measurements. In this respect, the difference between the two level measurements may be used to control the suppression of the acoustic reverberation in such a way that after a detected sound event, a decreasing, in particular a disappearing difference is used as an indicator that there are no further contributions from independent sound events in the audio signal, but only acoustic reverberation, so that the audio signal is maximally attenuated. A variable difference, in particular an increasing difference, after a detected sound event may in turn be understood as an indicator that additional, smaller sound events are present, and in consequence the audio signal preferably cannot yet be maximally suppressed.

The attenuation may be controlled in such a way that a constant attenuation is applied as a "trigger" after a sound event that has been detected based on the increase in the that difference, as soon as the difference between the first level measurement and second level measurement has again fallen below a predetermined threshold, because in that case it is assumed that the decay behavior of the sound event, in particular its acoustic reverberation, is occurring and causing the difference in the level measurements to disappear. After a detected sound event, however, the attenuation may also be increased with increasing time in a predetermined manner and, if necessary, as a function of the maximum level of the sound event as a reference value, further shortening the contributions of the acoustic reverberation in the audio signal.

Favorably, the first level measurement is chosen in such a way that it exhibits an exponential decay behavior. The second level measurement preferably is also selected with an exponential decay behavior. Exponential decay behavior signifies in particular that after a sound event with a clearly defined end, the level value output by the respective level measurement decreases exponentially with increasing time, or decreases linearly in time with logarithmic scaling. This has the particular advantage that the decay behavior of the first level measurement reflects the real decay behavior of the acoustic reverberation.

In a real acoustic situation, a sound event may be reflected on the walls and objects of a room, and for a given environment the respectively reflected sound depends on the sound pressure level of the original sound event. The reflected sound may in turn be reflected again by other walls and objects, and the sound component attributable to the renewed reflection likewise depends on the sound level of the first reflection. These dependencies for successive reflections result in an exponential decay of the sound event in the real acoustic situation. By selecting the first level measurement with a likewise exponential decay behavior, the first level measurement may be made with a suitable selection of the associated first decay time so that the first level measurement substantially reproduces the decay behavior of the real acoustic situation on which the audio signal is based.

Preferably, the first level measurement is implemented by using a first-order recursive low-pass filter. A filter of this kind provides the desired exponential decay behavior. Particularly preferably, the second level measurement is also implemented by using a first-order recursive low-pass filter.

Expediently, a physical decay time constant for an environment in which the audio signal was generated is selected as the first decay time of the first level measurement. Generating the audio signal, in this case, refers in particular to a corresponding conversion of the real acoustic situation through suitable transducers. For example, T60, the time at which the sound level has dropped by 60 dB, may be used as a decay time constant.

It is also advantageous if a noise background of the audio signal is ascertained, and the attenuation of the audio signal is controlled as a function of the noise background of the audio signal, particularly preferably as a function of the noise background, and is modified, applied, suspended or even re-used. In particular, knowledge of sound events obtained from the first level measurement and/or second level measurement may be used to determine the noise background, so that, for example, recognized sound events that exceed a minimum level are not interpreted as noise. However, the noise background of the audio signal may also be ascertained in other ways known to a person of ordinary skill in the art. A modification, in particular in the form of a correspondingly reduced attenuation of the audio signal as a function of the noise background when suppressing the acoustic reverberation, may prevent a detected acoustic reverberation from lowering or "pushing" the audio signal below its actual average noise components, which might be perceived as unnatural.

Particularly preferably, in the audio signal, noise suppression is carried out in which the attenuation is additionally controlled as a function of noise suppression. This means in particular that the audio signal should not be lowered below the noise background that is present in the audio signal after the noise suppression has been applied.

With the objects of the invention in view, there is also provided a method of suppressing an acoustic reverberation in an audio signal of a hearing device, wherein the audio signal is provided from an ambient sound signal by using an input transducer of the hearing device, and an acoustic reverberation in the audio signal is suppressed by the aforementioned method.

With the objects of the invention in view, there is concomitantly provided a hearing device with an input transducer for generating an audio signal, and a signal processing unit adapted to carry out the above-described method.

The advantages indicated for the method of suppressing an acoustic reverberation in an audio signal and for the refinements thereof may be applied analogously to the method employed in the hearing device and to the hearing device itself.

Other features which are considered as characteristic for the invention are set forth in the appended claims.

Although the invention is illustrated and described herein as embodied in a method of suppressing an acoustic reverberation in an audio signal and a hearing device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
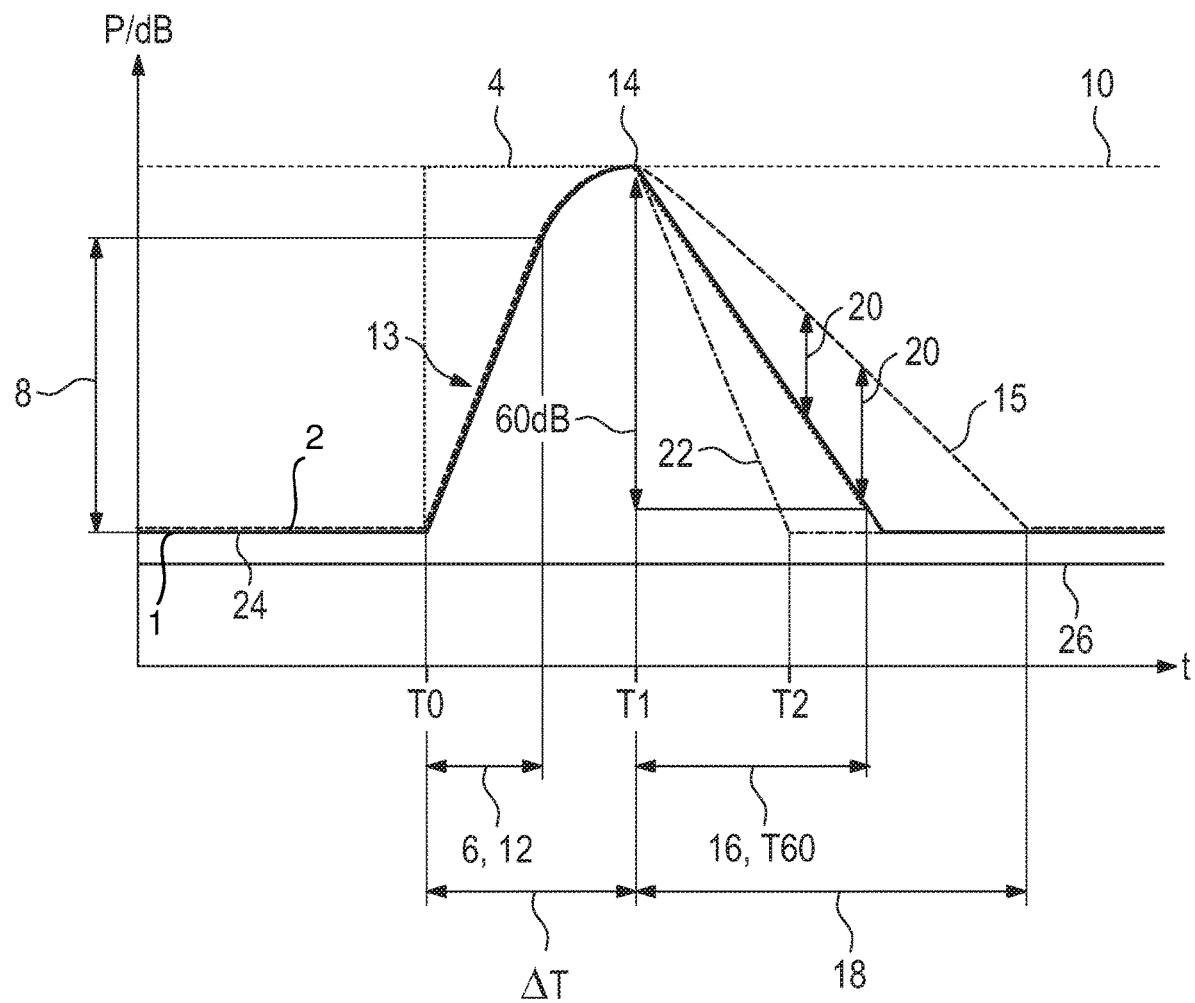
FIG. 1 is a time diagram of a first level measurement and second level measurement of the same audio signal with identical adjustment times and respectively different decay times.

Referring now in detail to the figures of the drawings, in which components and magnitudes that correspond to each other are respectively assigned the same reference signs, and first, particularly; to FIG. 1 thereof, there is seen a schematic illustration of level values P of a first level measurement 1 (solid line) and a second level measurement 2 (dashed line) in a time diagram, plotted against a time t, in which these measurements are each respectively carried out on an audio signal that is not otherwise shown. At a time T0, the audio signal contains an isolated sound event 4 (dotted line), which has a clearly defined end and also causes contributions of acoustic reverberation in the audio signal due to the physical environment in which the audio signal was recorded. The sound event 4 in this case should have only a very short duration ΔT. Thus, the total sound energy of the sound event 4 is concentrated in this time period ΔT. This may be the case, for example, with a bang, a strike, a clap or a similar sound of very short duration.

The first level measurement 1 has a first adjustment time 6, which elapses after the time T0 at which the sound event 4 begins, and runs until the first level measurement has taken up a predetermined proportion 8 of the asymptotic level 10. The asymptotic level 10 corresponds to the level which the first level measurement would take up for a stationary, continuous sound event having a signal level identical to the sound event 4. In this case, a second adjustment time 12 of the second level measurement 2 is identical to the first adjustment time 6 of the first level measurement 1.

For this reason, the first level measurement 1 and the second level measurement 2 have the same adjustment behavior 13, and thus at a time T1, which marks the end of the time period ΔT and thus the end of the sound event 4, they adopt the same maximum 14 for the level, which is just below the asymptotic level 10. At the time T1, in the real acoustic situation that the audio signal represents, the reverberation-influenced decay behavior begins, so that the first level measurement 1 and the second level measurement 2 now transition to their decay behavior 15 according to the respective decay time.

The first level measurement 1 has a first decay time 16, which corresponds exactly to a decay time constant T60. After this decay time, the sound level has decreased by 60 dB from the maximum 14. The second level measurement 2 has a second decay time 18 that is greater than the first decay time 16. For this reason, for the first level measurement 1, the straight line that describes the exponential decay behavior in the logarithmic scaling of the FIG. 1 diagram is correspondingly steeper than the straight line that describes the decay behavior of the second level measurement 2.

If a difference 20 is taken between the first level measurement 1 and the second level measurement 2, this difference 20 may be used to suppress the proportion of acoustic reverberation in the audio signal by attenuating the audio signal in a monotonically increasing dependence on this difference 20. In order to illustrate this, FIG. 1 schematically shows the sound level of an audio signal 22 (dotted-dashed line) that results from this attenuation.

The attenuation is performed only up to a noise background 24 of the audio signal, and is thus increasingly reduced in accordance with the noise background 24 at a time T2 at which the attenuated audio signal 22 would fall below the noise background 24 as a result of a further attenuation in accordance with the difference 20 between the first level measurement 1 and second level measurement 2. In particular, the above-mentioned reduction of the attenuation may also be carried out as a function of a residual noise background 26 formed of the noise that remains after noise suppression, instead of the noise background 24.

Figure 2:
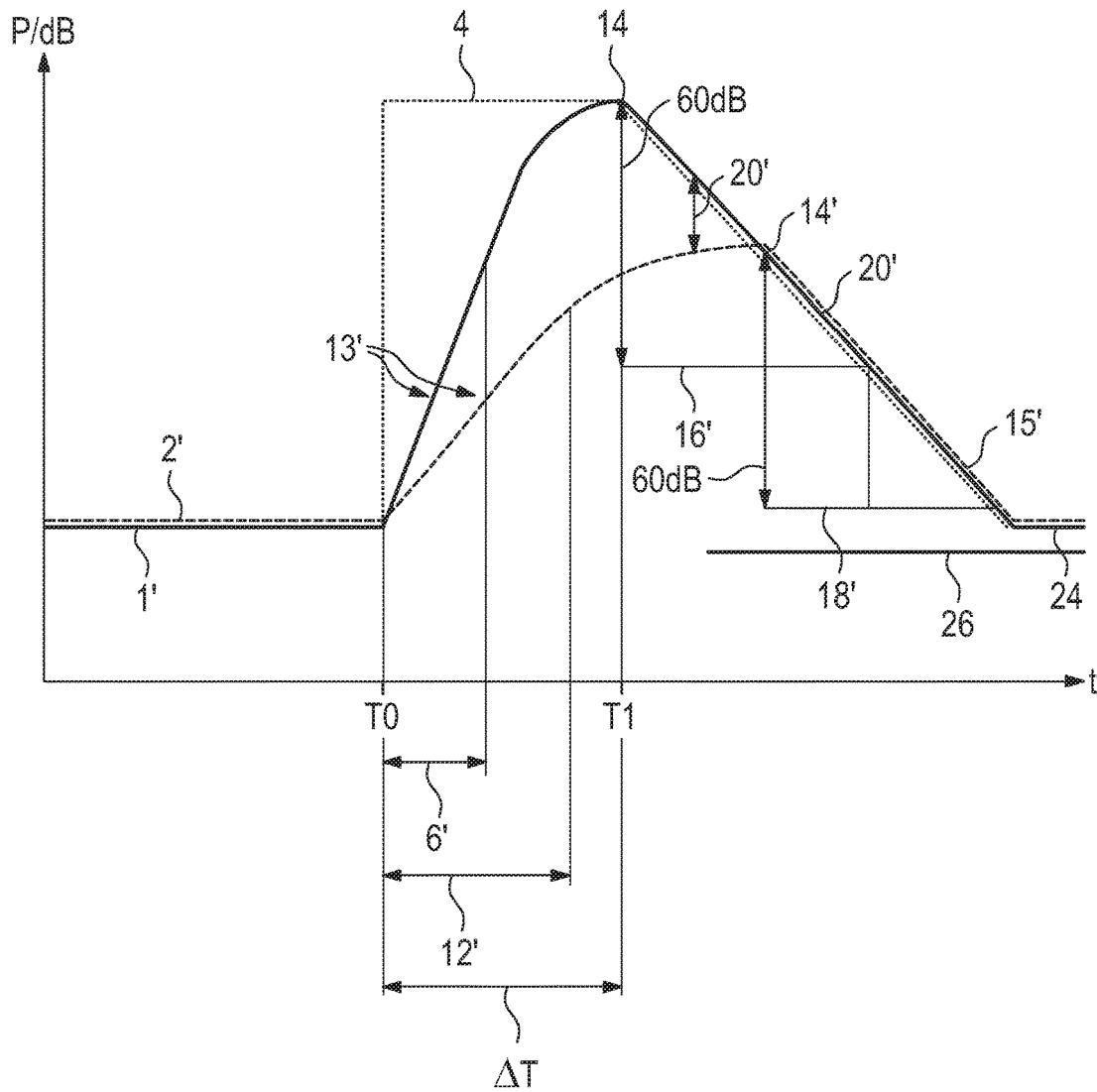
FIG. 2 is a time diagram of a first level measurement and second level measurement of the same audio signal with identical decay times and respectively different adjustment times.

In FIG. 2, the level values P of a first level measurement 1' (solid line) and a second level measurement 2' (dashed line) of an audio signal, which respond to a sound event 4 (dotted line), are shown schematically in a time diagram against a time t, with the sound event starting at a time T0 and ending again at a time T1 after a duration ΔT, In FIG. 2, the first adjustment time 6' is shorter than the second adjustment time 12'. As a result, at the time T1 the maximum 14 taken by the first level measurement 1' is significantly higher than the maximum 14' taken by the second level measurement 2'. The maximum 14' of the second level measurement 2' is taken by the second level measurement at a time later than T1. The difference 20' between the two level measurements 1', 2' already diverges considerably during an adjustment behavior 13'. At this point, the sound event 4 may be detected.

The first decay time 16' of the first level measurement 1' is identical to the second decay time 18' of the second level measurement 2', and is selected again as the decay time constant T60 (compare FIG. 1), After the aforementioned recognition of the sound event 4 based on the abruptly diverging difference 20' of the two level measurements 1', 2', the difference between the two level measurements 1', 2' decreases again after the time T0, because the first level measurement 1' has already changed to its decay behavior immediately after the time T1. The second level measurement 2' initially adjusts further to the decaying acoustic reverberation of the sound event 4 until the maximum 14' of the second level measurement 2' has reached the real instantaneous level of the decaying acoustic reverberation of the sound event 4. Based on the decrease of the difference 20' from the time T1, it may be concluded that the sound event 4 has now ended, and only its decay behavior 15' is present in the audio signal. In this case, a predetermined attenuation may be applied to the audio signal as the difference 20' decreases, provided that the occurrence of the sound event 4 has previously been detected by the sudden magnification of the difference 20'. Once again, as described with reference to FIG. 1, it is possible to modify or reverse the attenuation of the audio signal to suppress acoustic reverberation, as a function of the noise background 24 or residual noise background 26.

The methods described with regard to FIG. 1 and FIG. 2 for suppressing the acoustic reverberation in the audio signal may be carried out in particular on a frequency-band basis. To that end, the audio signal is divided into individual frequency bands in which the first and second level measurements 1, 1', 2, 2' are respectively carried out as shown. The attenuation of the audio signal may then be controlled individually for each frequency band based on the difference 20, 20' that has been ascertained in this frequency band, as a function of the respective adjustment behavior 13, 13' and decay behavior 15, 15'.

Figure 3:
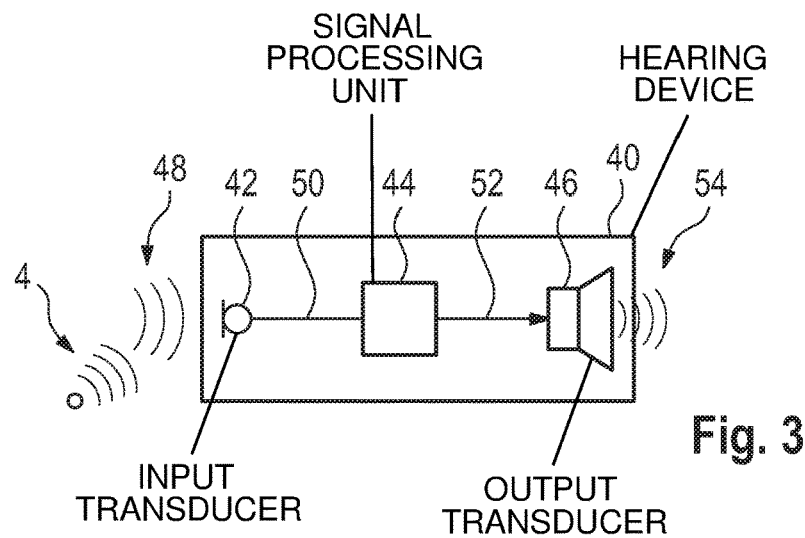
FIG. 3 is a block diagram of a hearing device.

FIG. 3 shows a block diagram of a hearing device 40 that has an input transducer 42, a signal processing unit 44 and an output transducer 46. The input transducer 42, which in this case is provided as a microphone, generates an audio signal 50 from an ambient sound signal 48 that also includes a specific sound event 4. In this case, an acoustic reverberation of the sound signal 4 in the audio signal 50 may be suppressed at the signal processing unit 44, as shown in FIG. 1 or as shown in FIG. 2. The signal thus resulting undergoes further processing, and in particular dynamic compression and frequency band-specific amplification, and as a result, an output signal 52 is generated that the output transducer 46 converts into an output sound signal 54.

Although the invention has been illustrated and described in greater detail with reference to the preferred exemplary embodiment, this exemplary embodiment does not limit the invention. A person of ordinary skill in the art will be able to derive other variations from this exemplary embodiment, without departing from the invention's protected scope.

The following is a summary list of reference numerals and the corresponding structure used in the above description of the invention:

1, 1' First level measurement
2, 2' Second level measurement
4 Sound event
6, 6' First adjustment time
8 Predetermined proportion
10 Asymptotic level
12, 12' Second adjustment time
13, 13' Adjustment behavior
14, 14' Maximum
15, 15' Decay behavior
16, 16' First decay time
18, 18' Second decay time
20, 20' Difference
22 Attenuated audio signal
24 Noise background
26 Residual noise background
40 Hearing device
42 Input transducer
44 Signal processing unit
46 Output transducer
48 Sound signal
50 Audio signal
52 Output signal
54 Output sound signal
ΔT (Time) duration
P Level values
t Time
T0, T1, T2 Time point
T60 Decay time constant

The invention claimed is:

1. A method of suppressing an acoustic reverberation in an audio signal, the method comprising the following steps:
   providing an audio signal;
   carrying out a first level measurement of the audio signal;
   carrying out a second level measurement of the audio signal at least temporarily during the first level measurement;
   carrying out the first level measurement with at least one of:
      a decay time differing from a decay time of the second level measurement, or
      an adjustment time differing from an adjustment time of the second level measurement;
   suppressing an acoustic reverberation of a sound event in the audio signal by attenuating the audio signal in response to the sound event in the audio signal; and
   controlling the attenuation as a function of a difference between the first level measurement and the second level measurement.

2. The method according to claim 1, which further comprises:
   performing the first level measurement with a first decay time;

performing the second level measurement with a second decay time being greater than the first decay time; and controlling the attenuation of the audio signal for suppressing the acoustic reverberation in the audio signal by using a monotonically increasing function of the difference between the first level measurement and the second level measurement.

3. The method according to claim 2, which further comprises:

performing the first level measurement with a first adjustment time; and carrying out the second level measurement with a second adjustment time being identical to the first adjustment time.

4. The method according to claim 1, which further comprises:

carrying out the first level measurement with a first adjustment time and a first decay time;

performing the second level measurement with a second adjustment time differing from the first adjustment time and a second decay time identical to the first decay time;

using an increase in the difference between the first level measurement and the second level measurement to infer a sound event; and after a start of the sound event, controlling the attenuation of the audio signal for suppressing the acoustic reverberation in the audio signal by using a monotonically falling function of the difference from the first level measurement and the second level measurement.

5. The method according to claim 1, which further comprises selecting the first level measurement to provide the first level measurement with an exponential decay behavior.

6. The method according to claim 5, which further comprises implementing the first level measurement by using a first-order recursive low-pass filter.

7. The method according to claim 1, which further comprises selecting a physical decay time constant as a first decay time of the first level measurement for an environment in which the audio signal was generated.

8. The method according to claim 1, which further comprises:

ascertaining a noise background of the audio signal; and controlling the attenuation of the audio signal as a function of the noise background of the audio signal.

9. The method according to claim 8, which further comprises:

carrying out noise suppression in the audio signal; and additionally controlling the attenuation as a function of the noise suppression.

10. The method according to claim 1, which further comprises:

decomposing the audio signal into a plurality of frequency bands;

respectively carrying out the first level measurement and second level measurement on a frequency-band basis;

attenuating the audio signal on a frequency-band basis in order to suppress the acoustic reverberation; and controlling the attenuation as a function of the difference between the first level measurement and the second level measurement in the respective frequency band.

11. A method of suppressing an acoustic reverberation in an audio signal of a hearing device, the method comprising the following steps:

providing the audio signal from an ambient sound signal by using an input transducer of the hearing device; and suppressing an acoustic reverberation in the audio signal by using the method according to claim 1.

12. A hearing device, comprising:

an input transducer for generating an audio signal; and a signal processing unit configured to perform the following steps:

carrying out a first level measurement of the audio signal;

carrying out a second level measurement of the audio signal at least temporarily during the first level measurement;

carrying out the first level measurement with at least one of:

a decay time differing from a decay time of the second level measurement, or an adjustment time differing from an adjustment time of the second level measurement;

suppressing an acoustic reverberation of a sound event in the audio signal by attenuating the audio signal in response to the sound event in the audio signal; and controlling the attenuation as a function of a difference between the first level measurement and the second level measurement.

* * * * *